United States Patent [11] 3,545,583

| [72] | Inventors | Janusz Cieszewski<br>Broniwoja 8/70, Warsaw;<br>Jan Czuba, Szopena 7/12, Pruszkow,<br>Poland |
|---|---|---|
| [21] | Appl. No. | 755,629 |
| [22] | Filed | Aug. 27, 1968 |
| [45] | Patented | Dec. 8, 1970 |
| [32] | Priority | Aug. 30, 1967 |
| [33] | | Poland |
| [31] | | No. P-122 389 |

[54] HYDRAULICALLY ENGAGEABLE MULTIPLE-DISK CLUTCH
7 Claims, 1 Drawing Fig.

[52] U.S. Cl. .................................................... 192/85,
192/113, 285/9
[51] Int. Cl. ................................................... F16d 25/00
[50] Field of Search. ........................................ 192/85(A
—2), 113.2, 86(Cursory)

[56] References Cited
UNITED STATES PATENTS

| 1,758,370 | 5/1930 | Olsen et al. | 192/85(A—2)X |
| 2,393,835 | 1/1946 | Stevenson | 192/85(A—2)X |
| 2,653,833 | 9/1953 | Barron | 192/85(A—2)X |
| 3,016,121 | 1/1962 | Mosbacher | 192/85(A—2)X |
| 3,202,252 | 8/1965 | Schilling | 192/85(A—2)X |

*Primary Examiner*—Benjamin W. Wyche, III
*Attorney*—Irvin A. Lavine

ABSTRACT: A hydraulically engageable multiple disk clutch having a hydraulic distributor including a fixed part mounted on a rotatable sleeve and a second part rotatable with the sleeve and bearing against the fixed part; the second part forms a portion of a pressure chamber, and supports an axially movable member which also forms a portion of the pressure chamber and which comprises a clamp to cause clutch engagement.

PATENTED DEC 8 1970 3,545,583
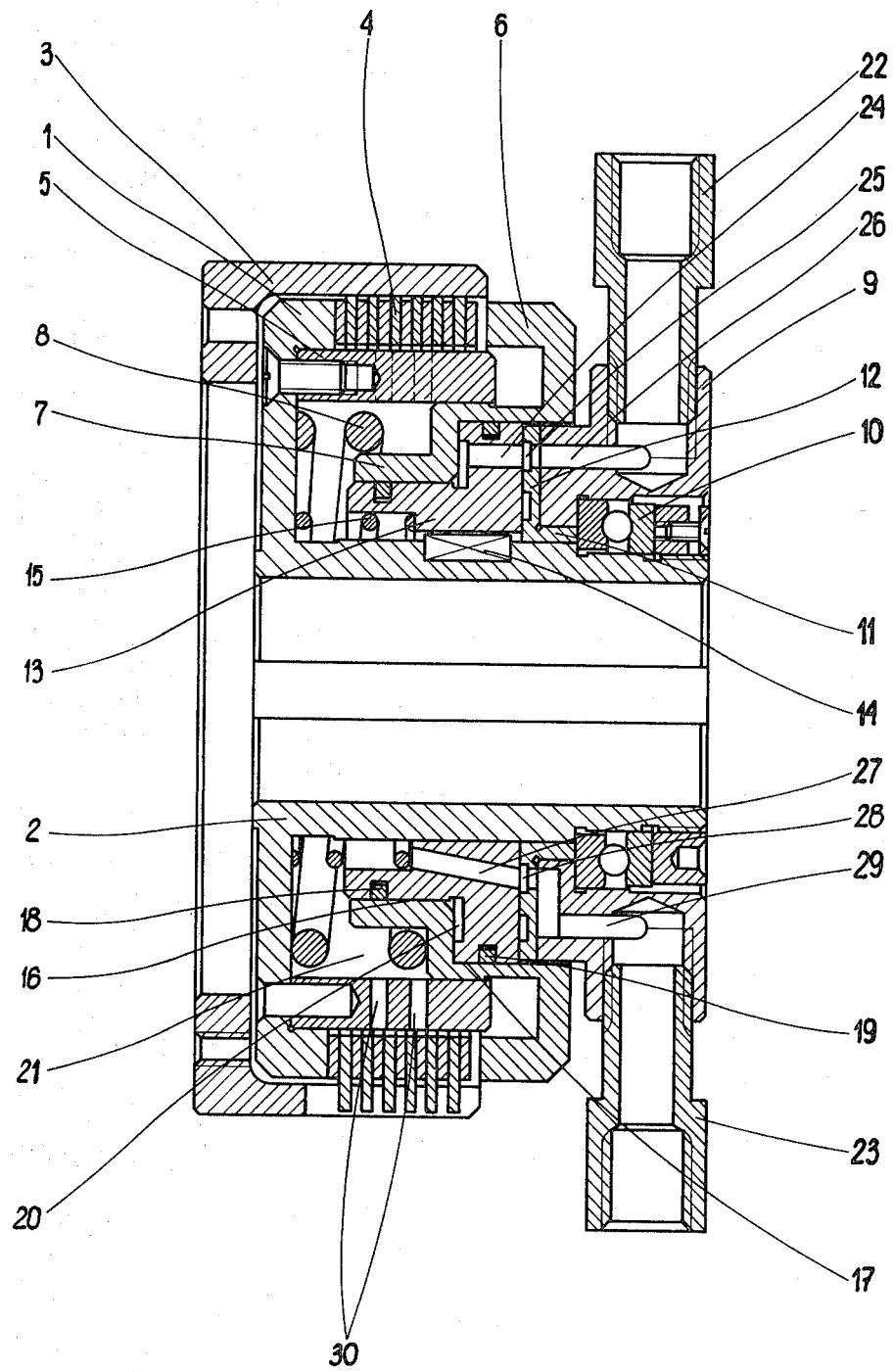

3,545,583

HYDRAULICALLY ENGAGEABLE MULTIPLE-DISK CLUTCH

In hitherto known, hydraulically engageable multiple-disc clutches e.g. according to Polish Pat. specification No. 45,939, the oil pressure controlling the clutch is supplied through a hollow shaft which is connected to the control system by a rotational connecting element mounted on its end.

This construction involves technological and mounting difficulties due to the necessity of drilling channels of considerable length, of fitting rotational connecting elements on the shaft ends and coupling them with the hydraulic control system by means of conduits which are in general outside of the basic machine body. This requires a suitable tightness of the connections, especially of the rotational connecting element, to avoid oil escape.

Another drawback of hitherto known, hydraulically engageable multiple-disc clutches are the considerable overall dimensions along the axis of the clutch which is caused by sequentially axially positioning the disc pack and the mechanism pressing together the discs which mechanism is in the form of piston and cylinder. rign-shaped The above-mentioned drawbacks and inconveniences are avoided by the hydraulically engageable multiple-disc clutch according to the present invention which is provided with control oil supply to the clutch through a stationary distributor part mounted rotationally with relation to the body of the clutch. The second rotational distributor part, connected with the body, is mounted so that it is axially shiftable and is pressed against the immovable part by the oil pressure and a spring, the hydraulic connection between the immovable and movable part of the distributor being secured by a pressure surface provided with ring-shaped. grooves. This surface may be formed by a separator which is connected with one part of the distributor and is made of a material used for the manufacture of slide bearings which fact ensures a proper cooperation of the immovable and rotational parts of the distributor. This allows a simple connection of the distributor with the conduits of the hydraulic control system at the place where the clutch is mounted on the shaft.

Moreover, the clutch according to the invention is provided with a mechanism designed for clamping the disc pack, which includes a clamp part and an integral piston part. A part of the piston is placed within a sleeve on which the disc pack is placed owing to which a compact construction and minimum overall dimensions along the axis of the clutch are obtained.

The sale FIG. of the accompanying drawing is an axial section of the clutch of the present invention.

The clutch according to the invention, shown on the drawing, is composed of the following basic assemblies: body, coupling part, disc pack clamping mechanism and rotational hydraulic distributor.

The body is composed of a rest disc 1 and an integral sleeve 2. The sleeve 2 enables the clutch to be mounted on a shaft.

The coupling part consists of an outer housing 3, a disc pack 4 and a sleeve 5 which is mounted to the rest disc 1. The disc pack 4 is radially betweeen the housing 3 and sleeve 5, some of the discs engaging the housing 3 and the others engaging the sleeve 5.

The disc pack clamping mechanism comprises a clamp part 6 and an integral piston part 7 having a sleeve position; said mechanism comprises also a disengaging spring 8. The piston part 7 together with the spring 8 are placed within the sleeve 5.

The rotational hydraulic distributor consists of an immovable part 9 journaled rotationally in relation to the sleeve 2 on the longitudinal ball bearing 10 and carries the sleevelike slide bearing 11 which is integral with the disc-shaped separator 12. The distributor also comprises a rotational part 13 carried on the sleeve 2 and connected with the latter by means of a key 14. Part 13 has an axially extending sleeve portion with a cylindrical bearing surface 16 and a disc portion with a cylindrical bearing surface 17, these bearing surfaces being provided with grooves containing the seal rings 18 and 19, respectively.

The rotational part 13 is pressed by a spring 15 against the separator 12, which is made of a material used for the manufacture of slide bearings. It constitutes an axially immovable element which supports sleeve positions of the piston part 7 on the cylindrical surfaces 16.

Between the part 13 and part 7, a hydraulic pressure chamber 20 is formed, a second hydraulic pressure chamber 21 being formed between the parts 1, 2, 5, 7 and 13. To the immovable part 9 of the distributor there are fastened the conduits 22 and 23 for connecting the pressure chambers to a hydraulic control system. The part 9 is secured against rotation by fastening one of the conduits 22, 23 in any way to an immovable element of the machine body.

The hydraulic chamber 20 is connected to the conduit 22 by means of the channel 24, ring-shaped groove 25 and channel 26. The hydraulic chamber 21 is connected to the conduit 23 by the channel 27, ring-shaped groove 28 and channel 29, and to the disc pack 4 through the channels 30.

The operation of the above described, hydraulically engageable multiple-disc clutch is as follows:

In the disconnected position of the clutch, the conduit 22 is connected to outflow, while the conduit 23 is supplied with a convenient amount of oil.

With such a connection, the piston part 7 due to the action of spring 8 is pressed against the disc portion of part 13 of the distributor.

The disc pack 4 is not pressed together and between the discs there is slip providing a residual torque the magnitude of which is insignificant in relation to the magnitude of the nominal torque transferred by the clutch.

An additional factor lowering the magnitude of the residual torque is the intensive centrifugal lubrication of the disc pack 4 owing to oil supply to the chamber 21. The oil is fed through the conduit 23 and from the chamber 21 it penetrates through the channels 30 into the disc pack 4.

When the clutch is to be engaged oil pressure is supplied to the conduit 22 and the conduit 23 is connected to the outflow. With such a connection, in the oil chamber 20 a pressure increase takes place causing the piston part 7 together with the clamp part 6 to be axially shifted, with compression of spring 8 until the clamp part 6 engages the disc pack 4 and the latter is clamped which gives rise to the transfer of the nominal torque between the rest disc 1 and the sleeve 2 mounted on the shaft, and the outer housing 3 which may be fastened to any element of the power transmission system.

The oil pushed out from the chamber 21 flows out through the conduit 23.

When the clutch is to be disengaged, in the oil chamber 20 a pressure drop occurs and due to the action of the spring 8 the oil is pushed out from the chamber 20 by the slidable piston part 7 and clamp part 6 moves away from the disc pack 4 which causes loosening of the pack and the occurence of a slip between the discs.

The oil which is being pushed out from the chamber 20 flows out through the conduit 23.

The oil supplied to the chamber 21 through the conduit 23 assists in shifting the piston part 7 by assisting the action of spring 8 due to the fact that in the chamber 21 a slight pressure occurs which is determined by the resistances of the oil flowing out through the channels 30.

The hydraulically engageable multiple-disc clutch according to the present invention is applicable especially to power transmission systems of machines having a hydraulic control system.

We claim:

1. A hydraulically engageable multiple disc clutch comprising:
   a rotatable sleeve having a rest disc extending therefrom;
   a hydraulic distributor axially spaced from said rest disc comprising a first fixed part journaled on said sleeve and including a pair of fluid conduit means, said hydraulic distributor further comprising a second part mounted on said sleeve for rotational movement therewith and engaging said first part;

an axially movable member mounted on said second part and including piston means providing first hydraulic pressure chamber between said second part and said member;

means defining a second hydraulic pressure chamber comprising said sleeve and rest disc, and the opposite side of said member from said first chamber;

passage means connecting each said hydraulic chamber with a said fluid conduit means; and disc clutch means engageable by said member upon axial movement thereof.

2. The clutch of claim 1, wherein said disc clutch means comprises a second sleeve carried by said rest disc radially outwardly of said first mentioned sleeve, said second sleeve in part defining said second chamber, a plurality of clutch discs carried on the outer surface of said second sleeve, a housing outwardly of said second sleeve, a plurality of clutch discs carried by said housing for cooperating with the first said clutch discs.

3. The clutch of claim 1 wherein said clutch disc comprises a second sleeve carried by said rest disc outwardly of said first mentioned disc said piston means of said member lying radially between said sleeves.

4. The clutch of claim 1 wherein said second part comprises a pair of axially spaced cylindrical surfaces of different diameters, said member having cylindrical surfaces in engaging relationship with said cylindrical surfaces of said second part.

5. The clutch of claim 4, and seal ring means for obstructing flow of fluid along said cylindrical surfaces.

6. The clutch of claim 1, wherein said passage means comprises a pair of spaced annular grooves in said first part and an axially extending passage connecting each said groove with a said chamber.

7. The clutch of claim 1, wherein said first part is made of bearing material where it is engaged by said second part.